United States Patent
Graf (10) Patent No.: US 12,508,541 B2
(45) Date of Patent: Dec. 30, 2025

(54) SYSTEMS AND METHODS FOR OXYGEN CONCENTRATION WITH ELECTROCHEMICAL STACKS IN SERIES GAS FLOW

(71) Applicant: United States of America as represented by the Administrator of NASA, Washington, DC (US)

(72) Inventor: John C. Graf, Houston, TX (US)

(73) Assignee: United States of America as represented by the Administrator of NASA, Washington, DC (US)

(*) Notice: Subject to any disclaimer, the term of this patent is extended or adjusted under 35 U.S.C. 154(b) by 509 days.

(21) Appl. No.: 18/000,703

(22) PCT Filed: Jun. 8, 2021

(86) PCT No.: PCT/US2021/036357
§ 371 (c)(1),
(2) Date: Dec. 5, 2022

(87) PCT Pub. No.: WO2021/252464
PCT Pub. Date: Dec. 16, 2021

(65) Prior Publication Data
US 2023/0201763 A1    Jun. 29, 2023

Related U.S. Application Data

(60) Provisional application No. 63/036,393, filed on Jun. 8, 2020.

(51) Int. Cl.
*C25C 3/00* (2006.01)
*B01D 53/32* (2006.01)
(Continued)

(52) U.S. Cl.
CPC ......... *B01D 53/326* (2013.01); *B01D 63/084* (2013.01); *B01D 2256/12* (2013.01); *B01D 2313/221* (2022.08); *B01D 2313/243* (2013.01)

(58) Field of Classification Search
CPC .. B01D 53/26; B01D 63/084; B01D 2256/12; B01D 2313/221
See application file for complete search history.

(56) References Cited

U.S. PATENT DOCUMENTS

| | | |
|---|---|---|
| 5,045,169 A | 9/1991 | Feduska et al. |
| 5,131,225 A | 7/1992 | Roettger |

(Continued)

FOREIGN PATENT DOCUMENTS

| | | |
|---|---|---|
| DE | 20104713 U1 | 5/2001 |
| DE | 202005003934 U1 | 6/2005 |

(Continued)

OTHER PUBLICATIONS

WIPO, International Search Report, WO2021252464—ISR—Dec. 16, 2021, 3 pages.

(Continued)

*Primary Examiner* — Zulmariam Mendez
(74) *Attorney, Agent, or Firm* — Kurt G. Hammerle; David G. Matthews (57) ABSTRACT

Concentration of oxygen gas with electrochemical stacks arranged in series gas flow. A system includes a plurality of electrochemical stacks for extracting oxygen from an input gas, wherein the plurality of electrochemical stacks outputs oxygen gas and oxygen-reduced gas. The system includes a heat exchanger in fluid communication with the plurality of electrochemical stacks, wherein the heat exchanger consumes the input gas and the oxygen-reduced gas, and wherein the heat exchanger transfers heat from the oxygen-reduced gas to the input gas. The system includes a mechani- (Continued)

cal blower for driving the input gas into the heat exchanger. The system is such that the plurality of electrochemical stacks are organized in series gas flow.

20 Claims, 8 Drawing Sheets

(51) Int. Cl.
*B01D 63/08* (2006.01)
*C25C 7/00* (2006.01)

(56) References Cited

U.S. PATENT DOCUMENTS

| | | |
|---|---|---|
| 5,186,793 A | 2/1993 | Michaels |
| 5,332,483 A | 7/1994 | Gordon |
| 5,454,923 A | 10/1995 | Nachlas et al. |
| 5,750,279 A | 5/1998 | Carolan et al. |
| 5,868,918 A | 2/1999 | Adler et al. |
| 5,888,272 A | 3/1999 | Prasad et al. |
| 5,910,238 A | 6/1999 | Cable et al. |
| 5,922,178 A | 7/1999 | Isenberg |
| 6,264,807 B1 | 7/2001 | Fenner et al. |
| 6,544,404 B1 | 4/2003 | Mazanec et al. |
| 6,638,400 B2 | 10/2003 | Riecke |
| 7,300,561 B2 | 11/2007 | Chaput et al. |
| 7,785,451 B2 | 8/2010 | Lin et al. |
| 8,431,227 B2 | 4/2013 | Takahashi et al. |
| 9,776,130 B1 | 10/2017 | Setlock et al. |
| 9,797,054 B2 | 10/2017 | Wu et al. |
| 9,901,866 B2 | 2/2018 | Kriegel |
| 2007/0034507 A1 | 2/2007 | Sin et al. |
| 2010/0032310 A1* | 2/2010 | Reid .................... C25D 17/008 |
| | | 205/261 |
| 2016/0144973 A1* | 5/2016 | Darling .................. A62C 3/065 |
| | | 204/265 |
| 2016/0145749 A1 | 5/2016 | Nigel |
| 2017/0341019 A1* | 11/2017 | Rheaume ............... B64D 37/32 |
| 2018/0185602 A1* | 7/2018 | Edwards ............ B01D 53/0446 |
| 2019/0226096 A1* | 7/2019 | Desai ....................... C25B 9/19 |
| 2020/0096241 A1* | 3/2020 | Vandermeulen ........ F25B 30/04 |

FOREIGN PATENT DOCUMENTS

| | | |
|---|---|---|
| JP | 2005200237 A | 7/2005 |
| JP | 4357452 B2 | 11/2009 |
| WO | 9106691 A1 | 5/1991 |

OTHER PUBLICATIONS

WIPO, Written Opinion of the International Searching Authority, WO2021252464—WOSA—Dec. 16, 2021, 12 pages.
SBIR, "Solid State Oxygen Concentrator and Compressor", available at https://www.sbir.gov/sbirsearch/detail/1425563, 2017, 4 pages.
Hutchings, Kent N. et al., "Electrochemical oxygen separation and compression using planar, cosintered ceramics", Solid State Ionics, May 31, 2008, vol. 179, Issues 11-12, Elsevier, available at https://doi.org/10.1016/j.ssi.2008.02.058, 9 pages.
Fraunhofer, "High-Temperature Membranes and Storage Materials: Integrated membrane/heat exchanger module for use in exhaust gases", Jun. 18, 2019, available at https://www.ikts.fraunhofer.de/en/departments/environmental_process_engineering/high_temperature_separation/high-temperature_membranes_storage_materials/integrated_membrane_heat_exchanger.html, 2 pages.

* cited by examiner

SYSTEMS AND METHODS FOR OXYGEN CONCENTRATION WITH ELECTROCHEMICAL STACKS IN SERIES GAS FLOW

CROSS-REFERENCE TO RELATED PATENT APPLICATION

This patent application is a national stage entry of International Patent Application No. PCT/US2021/036357, filed 8 Jun. 2021, which claims the benefit of priority to U.S. Provisional Patent Application No. 63/036,393, which was filed on Jun. 8, 2020, and is incorporated herein by reference in its entirety and for all purposes.

TECHNICAL FIELD

The disclosure relates generally to the concentration of oxygen gas and more particularly relates to ceramic systems and methods for capturing purified oxygen gas.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

The present disclosure extends to systems, methods, and devices for oxygen concentration using cascade gas flow over a plurality of electrochemical stacks organized in series gas flow. Each of the plurality of electrochemical stacks includes one or more wafers with a ceramic membrane comprising metal oxides. The ceramic membranes of the one or more wafers are configured to accept oxygen ions and permit non-oxygen atoms and molecules to pass through. The accepted oxygen ions are collected to form high-purity oxygen gas. The plurality of electrochemical stacks output the high-purity oxygen gas and an oxygen-reduced gas byproduct.

The plurality of electrochemical stacks are organized in series gas flow to increase efficiency of the system and reduce the need to preheat the input gas prior to feeding the input gas to the plurality of electrochemical stacks. The input gas is fed to a first electrochemical stack in the series gas flow. The oxygen-reduced gas byproduct of the first electrochemical stack is consumed by a second electrochemical stack in the series gas flow. The oxygen-reduced gas byproduct of the second electrochemical stack is consumed by a third electrochemical stack in the series gas flow, and so forth. Each of the plurality of electrochemical stacks heats the gas such that the oxygen-reduced gas byproduct output by an electrochemical stack is hotter than the input gas consumed by that electrochemical stack. Because the plurality of electrochemical stacks are organized in series gas flow, the oxygen-reduced gas byproduct output by the final electrochemical stack may be significantly hotter than the input gas fed into the first electrochemical stack.

The heated oxygen-reduced gas byproduct from the series of electrochemical stacks is fed into a heat exchanger. The heat exchanger transfers heat from the oxygen-reduced gas byproduct to a new input gas. The heat exchanger thereby cools the oxygen-reduced gas byproduct and heats the new input gas. The new input gas is fed into the plurality of electrochemical stacks. The system thereby heats the new input gas using energy stored in the oxygen-reduced gas byproduct. This increases the efficiency of the system and reduces the need to apply additional energy to preheat the input gas before introducing the input gas to the series of electrochemical stacks.

The systems, methods, and devices described herein are implemented for high efficiency oxygen purification and concentration. Numerous industries and procedures benefit from purified oxygen gas. In some instances, it may be beneficial or even necessary to use high purity oxygen gas that has a 95% or greater concentration of oxygen molecules. However, the methods known in the art for generating oxygen gas at any concentration, and particularly at high concentration levels, can be quite costly in terms of time, money, and energy resources. Further, such methods are typically implemented at large production plants and then shipped to end users in pressurized vessels. This approach causes a supply chain risk that can lead to devastating consequences in certain instances such as a natural disaster where oxygen is necessary for medical needs but cannot be shipped due to infrastructure problems. Disclosed herein are systems, methods, and devices for generating high purity or ultra-high purity oxygen gas. The systems, methods, and devices disclosed herein are cost and energy efficient, can be deployed on-demand, and without use of oxygen gas cylinders as an option to mitigate or avoid supply chain risks. They can produce ultra-high purity oxygen that exceeds regulatory purity specifications required for safe operation or use of purified oxygen.

The systems and methods described herein deploy a series of electrochemical stacks each comprising a plurality of ceramic wafers. Each of the multiple wafers includes multiple layers, including an anode, a cathode, and an electrolyte. The wafers of the electrochemical stack are configured to accept gaseous molecules when ambient air or some other "input" gas is passed through the electrochemical stack. The electrolyte layer within each of the multiple wafers is configured to accept or draw in oxygen molecules while remaining non-permeable to other non-oxygen molecules. When the input gas passes through one of the plurality of wafers of the electrochemical stack, the oxygen molecules are electrochemically separated from other components in the input gas, such as argon gas, nitrogen gas, carbon dioxide gas, and others. The separated oxygen is harvested and may be stored in a tank or immediately used. The other non-oxygen components may also be harvested or may be released into the environment. The electrochemical stack disclosed herein may generate high purity or ultra-high purity oxygen using only a fraction of the energy that is required to deliver traditional oxygen purification methods such as cryogenic air separation and/or pressure swing adsorption.

The electrochemical stacks described herein include wafers comprising ionic ceramic conductive membranes configured to generate a stream of high purity oxygen. In an embodiment, the ceramic membrane traps oxygen molecules and permits other gaseous atoms and molecules to pass through. The trapped oxygen molecules can be harvested to generate gas comprising greater than 99.9% purity oxygen gas ($O_2$). Some embodiments of the oxygen separation devices disclosed herein operate on-demand at near ambient conditions to provide exceptionally high purity oxygen gas.

The electrochemical stacks described herein are configured to generate extremely high purity oxygen streams in excess of 99.9% purity at high volumes. The volumetric flow of the electrochemical stacks may be equivalent to or greater than the volumetric flow of cryogenic separation systems in some embodiments. The electrochemical stacks may be run at high temperature with a voltage applied. The electrochemical stacks are constructed of a plurality of wafers that include at least one layer of metal that is oxidized. When ambient air (or any oxygen-containing gas) is passed over the electrochemical stack, a voltage is applied that separates the bond between the two oxygen molecules in stable oxygen gas ($O_2$) and generates two separate negatively charged oxygen ions ($2O^-$). The oxygen ions pass through the wafers in the electrochemical stack. Each wafer has a ceramic membrane that is made of metal oxides and the ceramic membrane accepts the oxygen ion when the oxygen gas passes over the wafer (e.g., when ambient air is blown over the wafer) and is ionized. The ceramic membrane accepts the oxygen ion due to a difference in oxygen partial pressure across the membrane. Because the specialized selection of materials in the ceramic membrane are not attracted to other compounds, the process filters oxygen at an exceptionally high purity rate.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one, skilled in the relevant art and now having possession of this disclosure, are to be considered within the scope of the disclosure described herein.

This description is not limited to the particular structures, configurations, process steps, and materials disclosed herein, for such structures, configurations, process steps, and materials may vary somewhat. It is also to be understood that the terminology employed herein is used for describing particular embodiments only and is not intended to be limiting.

In describing the subject matter of the embodiments herein, as used in this specification, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in an embodiment.

As used herein, the phrase "consisting essentially of" and grammatical equivalents thereof limit the scope of an embodiment to the specified materials or steps and those that do not materially affect the basic and novel characteristic or characteristics of the claimed disclosure.

Figure 1:
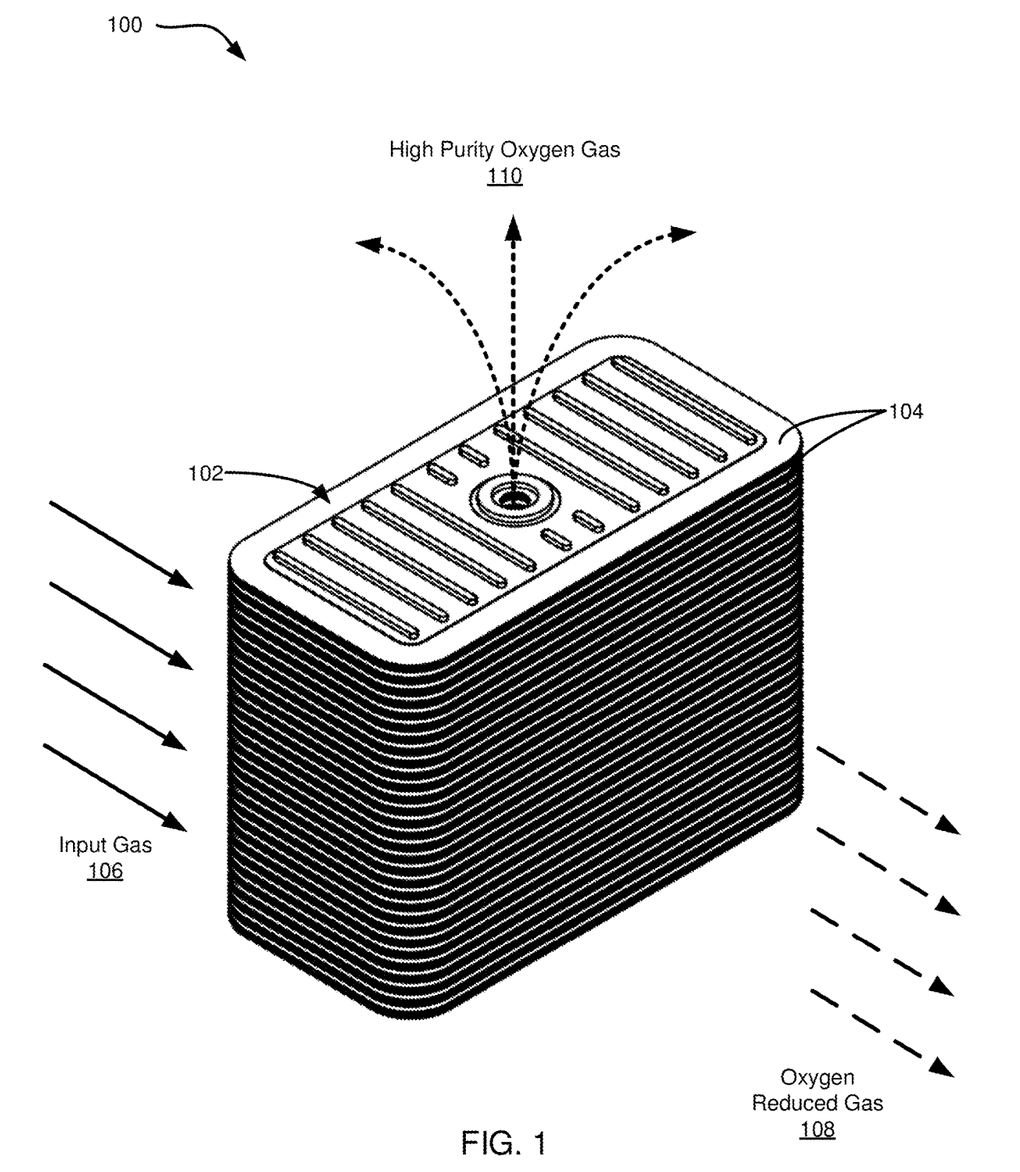
FIG. 1 is a perspective view of a system for generating high purity oxygen gas.

Referring now to the figures, FIG. 1 is a perspective view of a system 100 for generating high purity or ultra-high purity oxygen gas. The system 100 includes an electrochemical stack 102 that includes a plurality of wafers 104 stacked on top of one another. The system 100 may alternatively comprise a single wafer 104 or of any number of wafers 104 as needed by a user of the system 100. The number of wafers 104 may be specialized based on a desired output of oxygen gas, a threshold throttling voltage for the system 100, and/or a threshold maximum pressure for the system 100. The electrochemical stack 102 receives input gas 106 that may comprise any gas having oxygen molecules and may include ambient air. The electrochemical stack 102 outputs high purity oxygen gas 110 and oxygen-reduced gas 108. The wafers 104 receive the input gas 106 at a leading edge and output the oxygen-reduced gas 108 at a trailing edge as illustrated in FIG. 1. The wafers 104 output the high purity oxygen gas 110 at an opening or hole located within the wafer 104. The holes located within a plurality of wafers 104 making up the electrochemical stack 102 may align as illustrated in FIG. 1 such that a single hole or opening in the electrochemical stack 102 provides an exit point for the high purity oxygen gas 110.

The input gas may be preheated prior to being received by the leading edge of the electrochemical stack 102. The input gas may include air or some other oxygen-containing gas. In an implementation wherein a series of electrochemical stacks are arranged in series gas flow, the input gas for one electrochemical stack may include the oxygen-reduced gas byproduct of another electrochemical stack. In an example, the series gas flow arrangement includes three electrochemical stacks, including a first electrochemical stack, a second electrochemical stack, and a third (final) electrochemical stack. The first electrochemical stack receives air at the leading edge and outputs a first oxygen-reduced gas byproduct at the trailing edge. The second electrochemical stack receives the first oxygen-reduced gas byproduct at the leading edge and outputs a second oxygen-reduced gas byproduct at the trailing edge. The third electrochemical stack receives the second oxygen-reduced gas byproduct at the leading edge and outputs a final oxygen-reduced gas byproduct at the trailing edge. In this implementation, the "input gas" for a downstream electrochemical stack is the output gas from an upstream electrochemical stack within the series gas flow arrangement.

The wafers 104 described herein include an ionic ceramic conductive membrane configured for selecting oxygen ions and permitting other ions and molecules to pass over and through the electrochemical stack. The ceramic membrane may include at least an anode, cathode, and electrolyte, wherein the electrolyte is a specialized ceramic material configured to receive oxygen ions. The electrochemical stack may include an airtight seal associated with each wafer to ensure that high-purity oxygen gas can be collected from the electrochemical stack without introducing outside contaminants. One example of such wafers 104 is the ionic ceramic conductive membrane wafer manufactured and sold by American Oxygen of West Valley City, Utah, USA.

Figure 2:
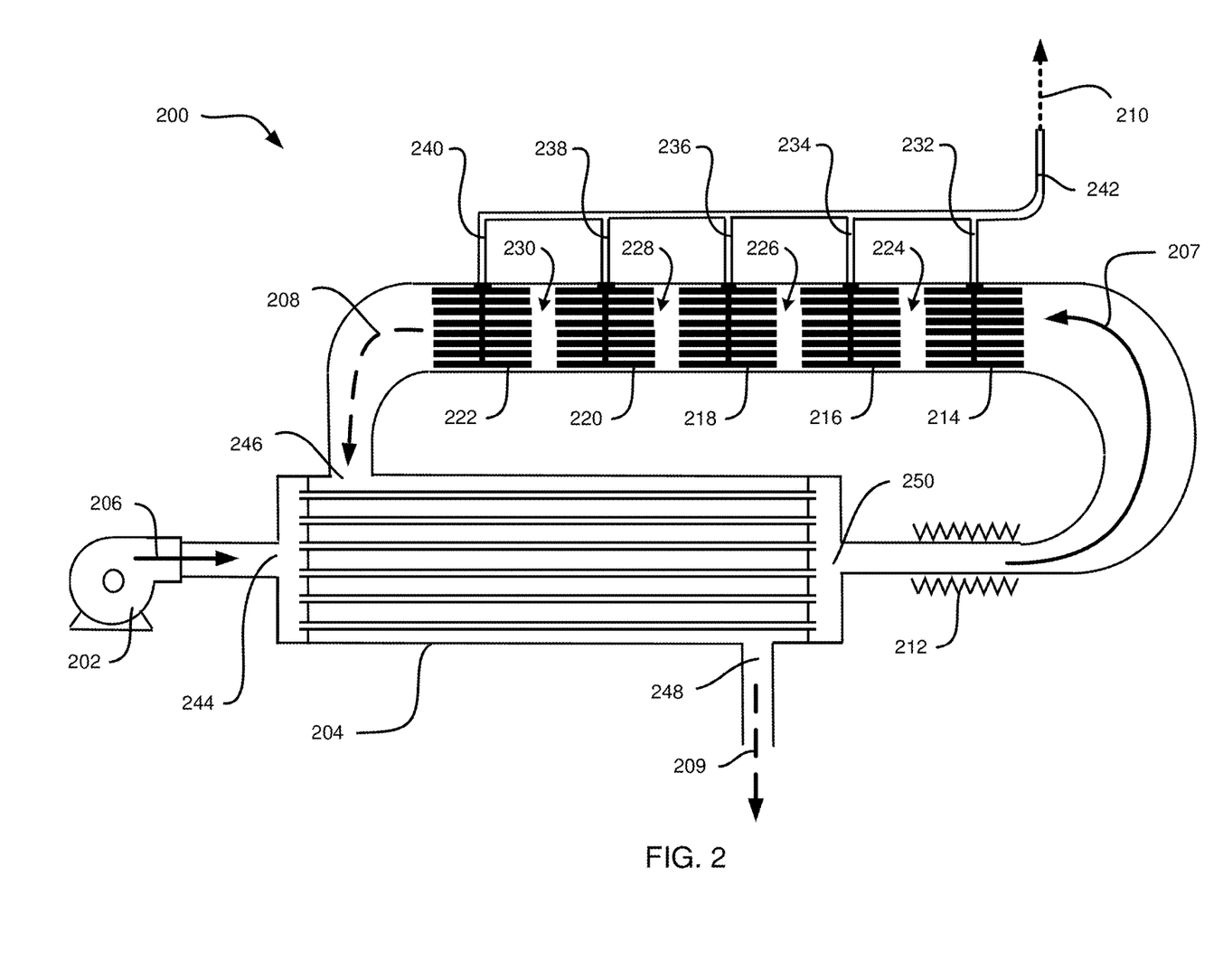
FIG. 2 is a schematic diagram of a system for ceramic electrochemical oxygen concentration with plurality of electrochemical stacks arranged in series gas flow.

FIG. 2 illustrates a system 200 for efficient heat exchange during sequenced oxygen concentration wherein a plurality of electrochemical stacks are arranged in series gas flow. The system 200 includes a mechanical blower 202 to drive an input gas stream through a heat exchanger 204 and then into a plurality of electrochemical stacks 214-222 arranged in series gas flow. In an embodiment, low temperature input gas 206 is driven into the heat exchanger 204 by the mechanical blower 202. The heat exchanger 204 facilitates the transfer of energy from the high temperature oxygen-reduced gas 208 to the low temperature input gas 206. This heat exchange is accomplished without mixing both of the two gases and by transferring heat from the high-energy gas to the low-energy gas. The low temperature input gas 206 rises in temperature and is converted to high temperature input gas 207 that is fed into the series of electrochemical stacks 214-222. The high temperature oxygen-reduced gas 208 releases heat and exits the system 200 as low temperature oxygen-reduced gas 209. The high purity oxygen gas 210 exits the system by way of the series of electrochemical stacks 214-222.

The system 200 enables numerous benefits and increases the efficiency and longevity of ceramic electrochemical oxygen concentration. One benefit enabled by the system 200 is increased gas flow over each wafer 104 when compared with stacks of wafers 104 positioned in parallel. In some instances, it is desirable to provide excess gas flow over each wafer 104 that is in excess of the stoichiometric requirement for extracting oxygen from the input gas. In an example, the input gas 206 is air, which typically includes about 21% oxygen gas. When the input gas 206 is air, the stoichiometric requirement for airflow is based on the contents of air (i.e., the approximately 21% oxygen gas included in air) and the amount of oxygen required to extract the desired output of purified oxygen gas 210. This amount of gas flow can lead to dramatic rises in temperature in the wafers 104 themselves, from the leading edge of the wafer 104 (i.e., where the input gas 206 begins to pass over the wafer 104) to the trailing edge of the wafer 104 (i.e., where the oxygen-reduced gas 208 exits the wafer 104). These dramatic temperature rises from leading edge to trailing edge can degrade the integrity of the wafers 104 and decrease the efficiency of oxygen extraction. Therefore, it is desirable to cool the wafers 104 during operation. One means of cooling the wafers 104 is providing excess gas flow over the wafers. The gas flow may be in "excess" of stoichiometric requirements for extracting the high purity oxygen gas 210. When excess gas flow is provided over the wafers 104, then the wafers 104 will extract high purity oxygen gas 210 according to the stoichiometric capabilities of the wafer 104, as discussed herein. Because excess gas is passed over the wafers 104, which is in excess of the stoichiometric capabilities of the wafers 104, the oxygen-reduced gas 208 will still include some oxygen gas.

The system 200 enables excess gas flow to be provided over the plurality of wafers 104 without dramatically increasing the flow rate of the input gas 206, as compared with electrochemical stacks 214-222 comprising vertically stacked wafers. In an illustrative example, it is desirable to provide a flow rate of 50 L/min of input gas 206. This flow rate may result in a sufficient output of high purity oxygen gas 210 and additionally provide additional gas flow for cooling wafers 104 during operation. In this example's implementation, the flow rate of 50 L/min decreases the temperature rise from leading edge to trailing edge for the wafers. Further describing this example's implementation, the desired output of high purity oxygen gas 210 is achieved by harnessing oxygen gas from 50 wafers. If each of the 50 wafers is singularly stacked vertically in a parallel flow arrangement (for example, the implementation illustrated in FIG. 1), then the flow rate over each of the 50 wafers will be only 1 L/min of input gas 206. However, if each of the 50 wafers is arranged and aligned in a row in series for the flow of input gas 206, then the flow rate over each of the 50 wafers will remain approximately near the initial flow rate of 50 L/min. In other words, the flow rate for the initial wafer will be 50 L/min, and then the flow rate will decrease with each subsequent wafer arranged in series thereafter based on the amount of oxygen gas that has been captured by each preceding wafer. Nevertheless, at the end of the series of wafers, the final fiftieth wafer will receive a flow rate greater than 1 L/min. This arrangement in series is desirable for ensuring that excess gas flow can be provided over each wafer for cooling the wafer during operation. As shown in FIG. 2, the system 200 includes multiple electrochemical stacks 102 positioned in series. This system 200 increases the flow rate of input gas over each wafer 104 when compared with stacking the same number of wafers vertically in a single electrochemical stack having parallel flow of the input gas.

In some embodiments, the electrochemical stack must be operated at a high temperature, for example from about 900 Kelvin ("K") to about 1100 K. In some embodiments, the efficiency of the electrochemical stack, and the speed at which the electrochemical stack can generate high purity oxygen gas 210, is dependent on the temperature of the gas within the electrochemical stack and/or the temperature of the wafers themselves. Therefore, it is desirable to control the temperature of the gas within the electrochemical stack and the temperature of the wafers themselves. The system 200 disclosed herein provides an efficient means for controlling the temperature of the gas entering the series of electrochemical stacks 214-222 and thereby increasing the efficiency and speed at which the series of electrochemical stacks 214-222 can generate the high purity oxygen gas 210.

In an embodiment, the system 200 includes a plurality of electrochemical stacks 102 (illustrated in FIG. 2 as 214, 216, 218, 220, and 222). The electrochemical stacks 214-222 may be in series with one another as illustrated in FIG. 2 such that the input gas 206, 207 follows one path through each of the electrochemical stacks 214-222. In an alternative embodiment, the electrochemical stacks 214-222 may be in parallel with one another such that the input gas 206, 207 splits into two or more paths. In such an embodiment, each of the two or more paths may include a plurality of electrochemical stacks 214-222 positioned in series with one another with respect to the path of flow of the input gas.

The system 200 illustrated in FIG. 2 includes five electrochemical stacks, including a first electrochemical stack 214, a second electrochemical stack 216, a third electrochemical stack 218, a fourth electrochemical stack 220, and a fifth electrochemical stack 222. The five electrochemical stacks may be referred to collectively herein as the series of electrochemical stacks 214-222. Each of the electrochemical stacks within the series of electrochemical stacks 214-222 includes an outlet for high purity oxygen gas 210. The first electrochemical stack 214 includes a first outlet 232 for high purity oxygen gas 210. The second electrochemical stack 216 includes a second outlet 234 for high purity oxygen gas 210. The third electrochemical stack 218 includes a third outlet 236 for high purity oxygen gas 210. The fourth electrochemical stack 220 includes a fourth outlet 238 for high purity oxygen gas 210. The fifth electrochemical stack 222 includes a fifth outlet 240 for high purity oxygen gas 210. As illustrated in FIG. 2, each of the outlets 232-240 may combine into an oxygen delivery port 242 for the high purity oxygen 210, which may then lead to an oxygen receiver tank or other device for collecting the high purity oxygen gas 210.

As the high temperature input gas 207 passes through the series of electrochemical stacks 214-222, each electrochemical stack heats the high temperature input gas 207 sequentially. Therefore, the high temperature, oxygen-reduced gas 208 has a higher temperature than the high temperature input gas 207. The high temperature input gas 207 passes through the first electrochemical stack 214. The first electrochemical stack 214 generates high purity oxygen gas 210 that exits through the first outlet 232. Some of the high temperature input gas 207 exits the first electrochemical stack 214 and serves as second stack gas input 224 for the second electrochemical stack 216. The second electrochemical stack 216 generates high purity oxygen gas 210 that exits through the second outlet 234. The second stack gas input 224 has now passed through the second electrochemical stack 216 and serves as third stack gas input 226. This process continues as the third stack gas input 226 is processed through the third electrochemical stack 218 and serves as fourth stack gas input 228 for the fourth electrochemical stack 220. Again, the fourth stack gas input 228 is processed through the fourth electrochemical stack 220, and then this gas serves as the fifth stack gas input 230 for the fifth electrochemical stack. The high temperature oxygen-reduced gas 208 exits the final electrochemical stack within the series of electrochemical stacks 214-222. This high temperature oxygen-reduced gas 208 is then fed into the heat exchanger 204. In an embodiment, the high temperature oxygen-reduced gas 208 exiting the fifth electrochemical stack 222 has the highest temperature, and is the most depleted of oxygen, when compared with the oxygen provided to any of the other input gasses 207, 224, 226, 228, 230.

The first electrochemical stack 214 is energized with a direct current (DC) having a first amperage. The second electrochemical stack 216 may be energized with a direct current having a second amperage. In an embodiment, the second amperage of direct current supplied to the second electrochemical stack 216 is greater than the first amperage of direct current supplied to the first electrochemical stack 214. Continuing down the series of electrochemical stacks 214-222, the third electrochemical stack 218 is powered by a direct current having a third amperage; the fourth electrochemical stack 220 is powered by a direct current having a fourth amperage; and the fifth electrochemical stack 222 is powered by a direct current having a fifth amperage. In an embodiment, the amperage supplied to a subsequent electrochemical stack (e.g., second, third, fourth, or fifth stack, respectively) is greater than the amperage supplied to the correspondingly preceding electrochemical stack (e.g., first, second, third, or fourth stack, respectively). Therefore, the fifth amperage applied to the fifth electrochemical stack 222 may be the greatest amperage, such that the fifth electrochemical stack 222 produces more oxygen than any of the preceding electrochemical stacks 220, 218, 216, and 214 produce.

The temperature of gas exiting an electrochemical stack 102 is higher than the temperature of gas that entered the electrochemical stack 102. Therefore, in an embodiment, the second stack gas input 224 has a higher temperature than the high temperature input gas 207. Similarly, the third stack gas input 226 has a higher temperature than the second stack gas input 224; the fourth stack gas input 228 has a higher temperature than the third stack gas input 226; and the fifth stack gas input 230 has a higher temperature than the fourth stack gas input 228. System 200 may include any suitable number of electrochemical stacks 102, and this process of higher temperature may continue for any number of electrochemical stacks.

The number of electrochemical stacks within the series of electrochemical stacks 214-222 is optimized and selected based on the temperature gain from each electrochemical stack. The efficiency of the electrochemical stacks may be based on the temperature of the input gas and/or the temperature of the electrochemical stack itself. In some embodiments, the electrochemical stack is most efficient at a temperature range from about 900 K to about 1100 K. Further, in some embodiments, a single electrochemical stack may raise the temperature of gas between the input and the output of each electrochemical stack 214-222 by a measurement ranging from about 10 K to about 100 K. The number of electrochemical stacks within the series of electrochemical stacks 214-222 may be optimized based on the temperature range for maximum efficiency of the electrochemical stacks and the change in temperature caused by each electrochemical stack.

In one embodiment, the series of electrochemical stacks 214-222 has five electrochemical stacks as illustrated in FIG. 2. In such an embodiment, the temperature of the high temperature input gas 207 might be from about 700 K to about 1100 K. Each of the electrochemical stacks may raise its own input temperature by an amount ranging from about 10 Kelvins to about 100 Kelvins, such that the oxygen-reduced gas that exits each such electrochemical stack is from about 10 Kelvins to about 100 Kelvins greater than the respective input gas that entered the electrochemical stack. Therefore, on the low end of the range, the high temperature oxygen-reduced gas 208 may have a temperature at least 50 Kelvins greater than the temperature of the high temperature input gas 207. These temperature ranges may vary for different implementations of the disclosure, and the number of electrochemical stacks within the system 200 may vary to optimize the efficiency of oxygen purification.

The high temperature oxygen-reduced gas 208 is fed directly into the heat exchanger 204. In an embodiment, the heat exchanger 204 is a high efficiency and low-pressure heat exchanger configured to facilitate the transfer of heat from high temperature gas to low temperature gas. The heat exchanger 204 receives the high temperature oxygen-reduced gas 208 and the low temperature input gas 206. The heat exchanger 204 facilitates the transfer of heat from the high temperature oxygen-reduced gas 208 to the low temperature input gas 206. This transfer of heat not surprisingly causes the high temperature oxygen-reduced gas 208 to decrease in temperature and as it causes the low temperature input gas 206 to increase in temperature. The heat exchanger 204 outputs oxygen-reduced gas 209 at a lower temperature as compared to the temperature of output gas 208, and it outputs input gas 207 at a higher temperature as compared to the temperature of input gas 206. The oxygen-reduced gas 209 may likely have a higher temperature when compared with the temperature of input gas 206. The temperature of the oxygen-reduced gas 209 is low when compared to the temperature of the oxygen-reduced gas 208 that is fed into the heat exchanger 204.

In an implementation, the low temperature input gas 206 is at room temperature and is received by the heat exchanger at the cold side inlet 244. The higher temperature, oxygen-reduced gas 208 is received by the heat exchanger 204 at the air-to-air heat exchanger hot side inlet 246. The oxygen-reduced gas 209 exits the heat exchanger 204 at the processed air outlet 248 located at the warmer side of the heat exchanger 204. The higher temperature input gas 207 may exit the heat exchanger 204 at the outlet 250.

In an embodiment, the system 200 further includes a heater 212 for increasing the temperature of the ducting stream of the input gas 207. The heater 212 may be configured for raising the temperature of the input gas to the appropriate temperature for increased efficiency of oxygen purification by the series of electrochemical stacks 214-222. Therefore, the gas exiting the heat exchanger 204 at the outlet 250 may have an increased temperature compared with the temperature of the input gas 206 that entered the heat exchanger. The heater 212 may then further increase the temperature of the gas exiting the heat exchanger such that the temperature of input gas 207 is at the appropriate pre-determined temperature for high-efficiency and high-purity oxygen purification by the series of electrochemical stacks 214-222.

In another embodiment, the system 200 further includes inlets (not shown in FIG. 2) for providing ambient air or lower temperature air between the electrochemical stacks within the series of electrochemical stacks 214-222. In such an embodiment, the ambient air may be injected in between the stacks, for example at the plenums proximate to the gas inputs 224, 226, 228, and/or 230 of FIG. 2, for cooling the primary process gas flow from the leading end to the trailing end of the primary flow duct. This injection of ambient gas may mix with the hot primary process gas flow and lower the temperature of the mixture a prescribed amount. In some instances, injecting cooling mix gas has the added benefit of increasing the hot gas mass flow through the heat exchanger 204, and this increased flow in turn provides additional available thermal energy to pre-heat the primary process gas flow passing through the heat exchanger 204.

The series gas flow arrangement of the plurality of electrochemical stacks 214-222 increases the efficiency of the system and reduces the need to preheat the input gas with the heater 212. The input gas is heated "for free" by transferring heat from the oxygen-reduced gas 208 into the input gas 206. The oxygen-reduced gas 208 has been heated by the series of electrochemical stacks 214-222 during operation of the system. The electrochemical stacks can more efficiently extract oxygen ions from the input gas when the gas passes at a high temperature (and when the electrochemical stacks themselves comprise a high temperature). The electrochemical stacks become increasingly more efficient downstream in the series gas flow, and the gas passing through the series gas flow becomes increasingly hotter with each electrochemical stack. The oxygen-reduced gas 208 output may be significantly hotter than the input gas 206. The heat exchanger transfers the energy stored in the heated oxygen-reduced gas 208 output to the input gas 206. This significantly increases the temperature of the input gas 206 without straining the heater 212.

Figure 3A:
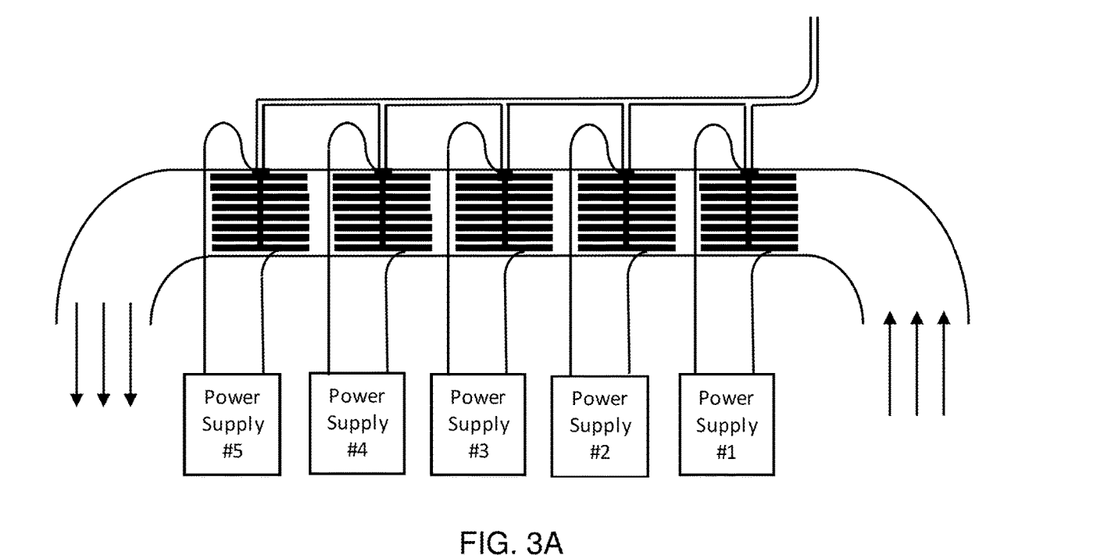
FIGS. 3A and 3B illustrate embodiments of reversing gas flow and power supply up-stepping of a system for oxygen concentration with series gas flow.
Figure 3B:
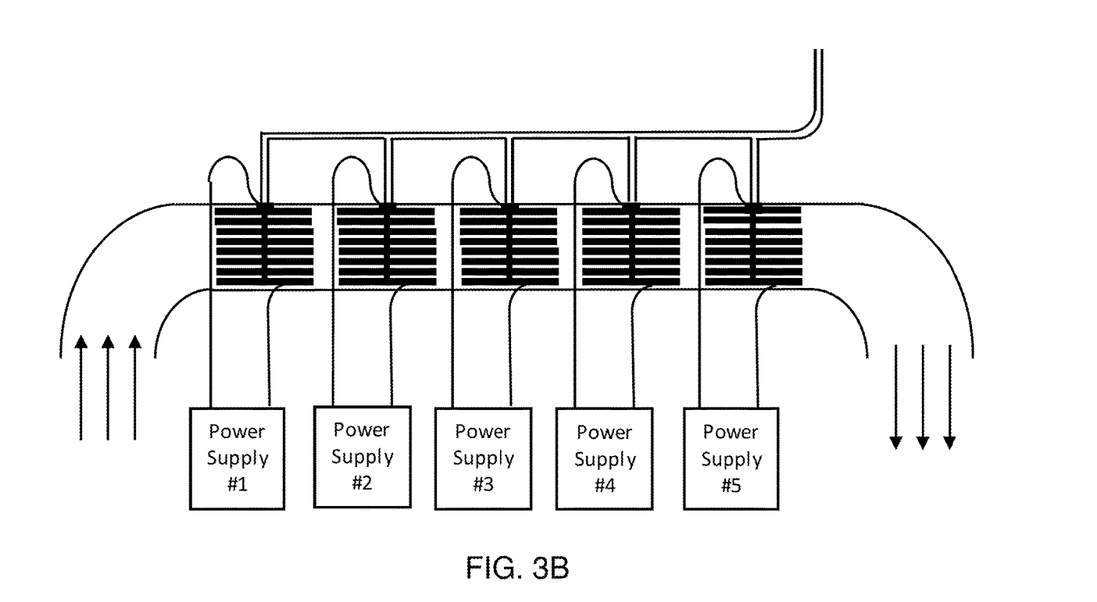

FIGS. 3A and 3B illustrate that the direction of gas flow through the system 200 can be reversed. In FIG. 3A, the flow of input gas begins on the right-hand side of view and the oxygen-reduced gas exits on the left-hand side. FIG. 3B, the flow of input gas beings on the left-hand side of view and the oxygen-reduced gas exits on the right-hand side. As illustrated, each of the electrochemical stacks may be powered by an independent power supply. The power supply for the initial electrochemical stack may supply a lower direct current when compared with the current supplied to subsequent electrochemical stacks.

In the examples illustrated in FIGS. 3A-3B, power supply number one is connected to the first electrochemical stack and may be configured to supply the least amount of current when compared with subsequent electrochemical stacks. Power supply number two is connected to the second electrochemical stack, which receives the oxygen-reduced gas that exits the first electrochemical stack. Power supply number two may supply a greater current when compared with the current supplied to the first electrochemical stack. This trend may continue with power supplies number three, four, and five, such that the final electrochemical stack receives more current than any prior electrochemical stack.

The system may include an independent power supply for each electrochemical stack. Each independent power supply may provide a different direct current to its assigned electrochemical stack. In an alternative embodiment, the system includes a single power supply configured to provide varying quantities of direct current to each of the plurality of electrochemical stacks.

Figure 4:
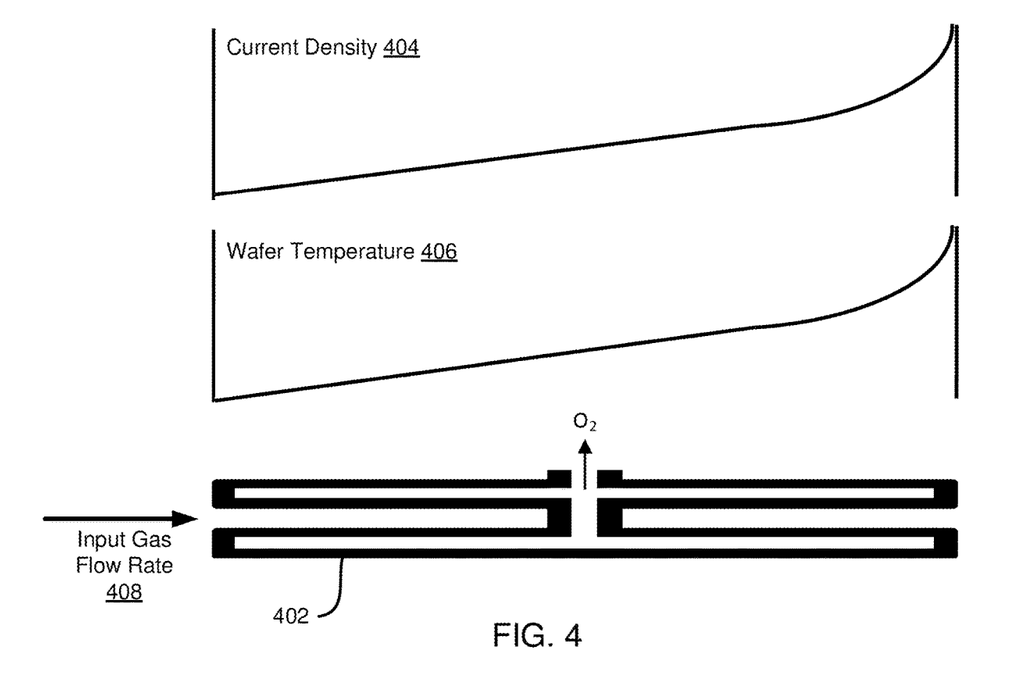
FIG. 4 illustrates changes in wafer temperature and current density from leading edge to trailing of an electrochemical wafer during operation in accordance with an embodiment described herein.
Figure 5:
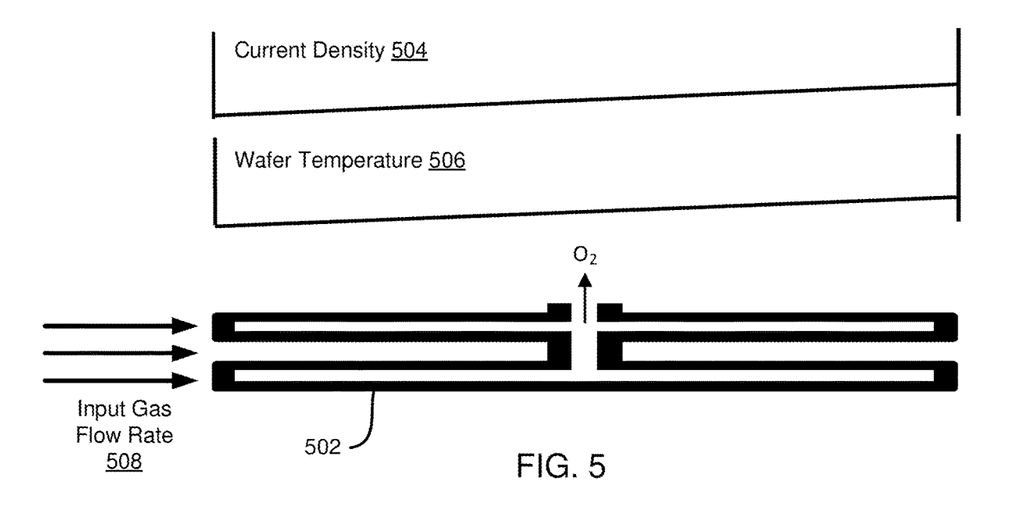
FIG. 5 illustrates changes in wafer temperature and current density from leading edge to trailing of an electrochemical wafer during operation with a greater flow rate than the embodiment of FIG. 4.

FIGS. 4 and 5 illustrate the increase in temperature and electric current density across a wafer as a function of the flow rate of input gas. Each of the plurality of electrochemical stacks arranged in the series gas flow may include one or more wafers. Each of the one or more wafers includes a ceramic membrane configured to capture oxygen ions. The wafers become increasingly more effective at capturing oxygen ions when operated at high temperature.

In FIG. 4, an input gas enters a wafer 402 at the leading edge (illustrated on the left-hand side of view in FIG. 4) and oxygen-reduced gas exits the wafer 402 on the trailing edge on the opposite end. High-purity oxygen gas exits the wafer 402 through the center collection port. Similarly, in FIG. 5, input gas enters the wafer 502 at the leading edge, oxygen-reduced gas exits the wafer 502 on the trailing edge, and high-purity oxygen gas exits the wafer 502 through the collection port. The flow rate 508 of input gas as illustrated in FIG. 5 is three-times greater than the flow rate 408 of input gas illustrated in FIG. 4. As shown, the flow rate of input gas has a significant impact on the temperature 406, 506 and the current density 404, 504 of the wafer during operation.

If the flow rate of input gas 408 is low, as for example when the flow rate 408 is equal to the stoichiometric requirement for extracting high-purity oxygen gas, then the temperature 406 of the wafer will increase significantly from the leading edge to the trailing edge. The exponential graph of temperature 406 illustrates the difference in wafer temperature at the leading edge (on the left-hand view of the graph) versus the wafer temperature at the trailing edge (at the right-hand view of the graph). As shown, when there is no excess gas for cooling the wafer, the temperature of the wafer itself will increase significantly, as the input gas is processed to extract oxygen gas. On the other hand, when excess input gas is provided to the wafer, as illustrated in FIG. 5, then the excess gas cools the wafer and the increase in wafer temperature 506 is not as severe. Similarly, the current density 404 of the wafer increases significantly when there is no excess gas passing over the wafer. The increase in current density 504 is not as severe when the flow rate 508 of input gas provides for excess gas to flow over the wafer and cool it down during operation.

Figure 6:
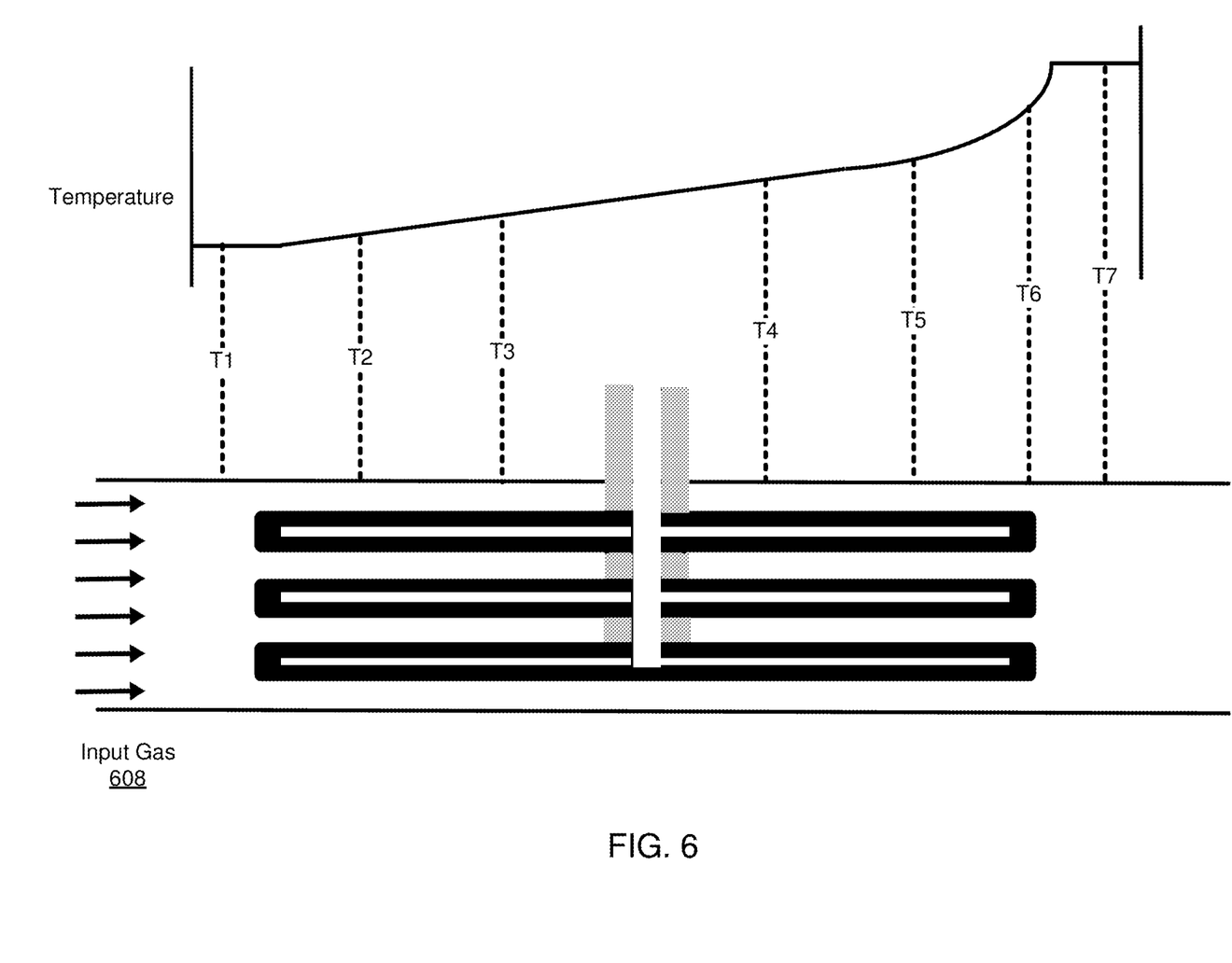
FIG. 6 illustrates changes in wafer temperature and current density from leading edge to trailing of an electrochemical wafer during operation in accordance with another embodiment described herein.

FIG. 6 illustrates the increase in temperature of a wafer during operation from the leading edge to the trailing edge. FIG. 6 illustrates multiple temperature points for an electrochemical stack comprising three wafers. The temperature points include T1, T2, T3, T4, T5, T6, and T7. The graph illustrates the change in temperature of the input gas and the wafers themselves at different positions on the stack of wafers. A temperature point T1, where the input gas 608 is provided to the wafer, the temperature is relatively low as shown in the graph. At temperature point T2, at a point near the leading edge of the wafer, the temperature is still relatively low but has climbed relative to temperature point T1. Temperature points T3 and T4 illustrate that the temperature of the wafers and the input gas continue to climb during operation. Temperature points T5 and T6 illustrate that the temperature of the wafers and the input gas continue to climb at a greater rate. Temperature point T7 illustrates that the temperature remains high and stable after the input gas has passed over the wafers.

Figure 7A:
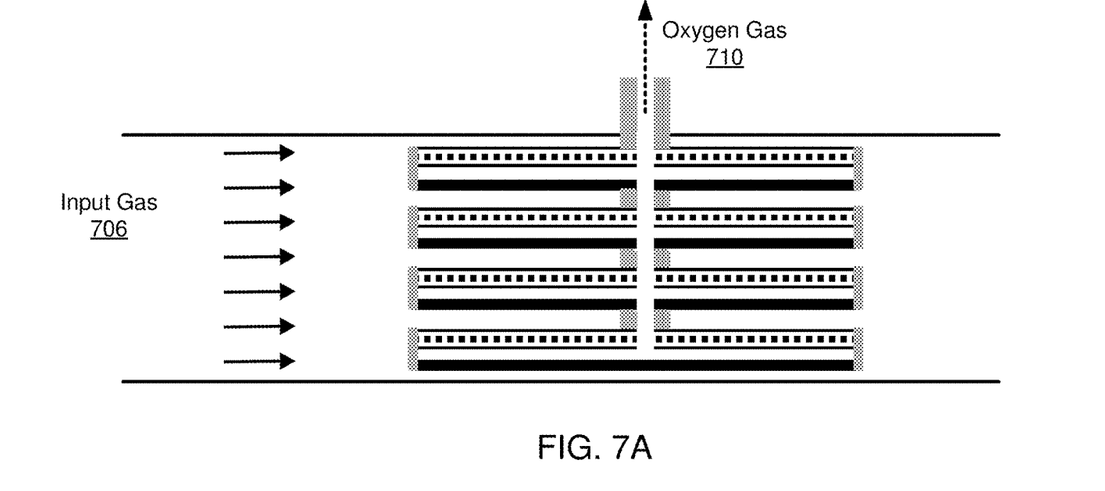
FIG. 7A illustrates an electrochemical stack comprising a plurality of wafers in parallel for receiving input gas flow.
Figure 7B:
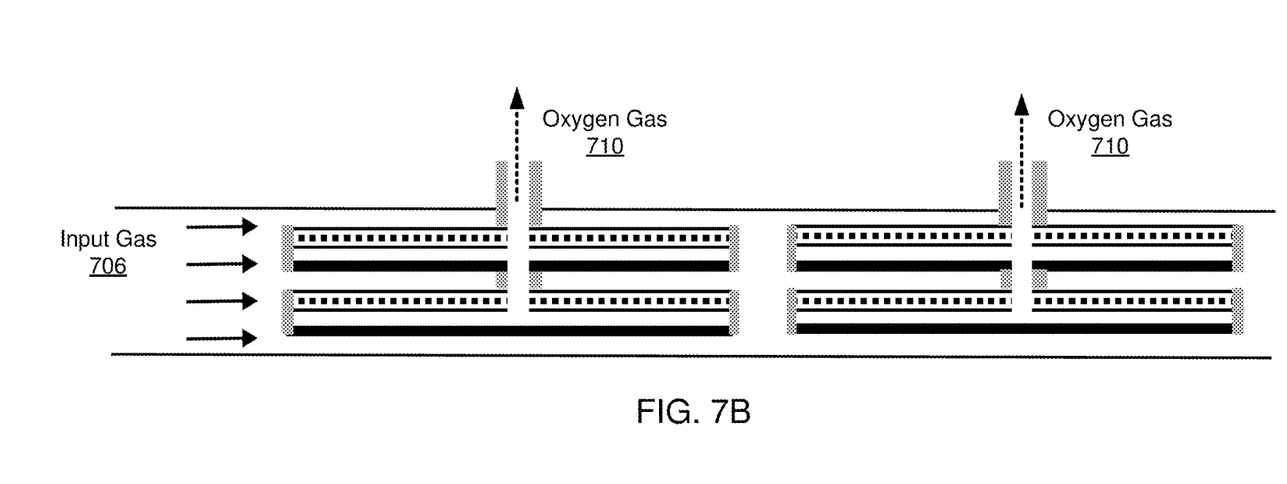
FIG. 7B illustrates a series of two electrochemical stacks each comprising two wafers in parallel for receiving input gas flow.

FIGS. 7A and 7B illustrate the difference in flow rate for an input gas 706 for an all-parallel wafer stack (e.g., a single stack) versus a series of multiple stacks of electrochemical wafers. In FIG. 7A, four wafers are presented in parallel in a single electrochemical stack. Because the input gas 706 passes over each of the four wafers at the same time, the flow rate of the input gas 706 is divided between the four wafers. To ensure each of the wafers is sufficiently cooled by excess gas flow during operation, a greater flow rate of input gas must be presented to the stack when compared with the flow rate for implementation in FIG. 7B. In FIG. 7B, two electrochemical stacks each comprising two wafers are presented in series. Because the input gas 706 is first presented to the first electrochemical stack and is then presented to the second electrochemical stack, the flow rate of the input gas 706 is divided between the two wafers in the first electrochemical stack and is then divided between the two wafers in the second electrochemical stack. Therefore, a reduced flow rate of input gas 706 may be presented to the series of electrochemical stacks in FIG. 7B without sacrificing the excess flow rate for cooling the wafers during operation.

Figure 8A:
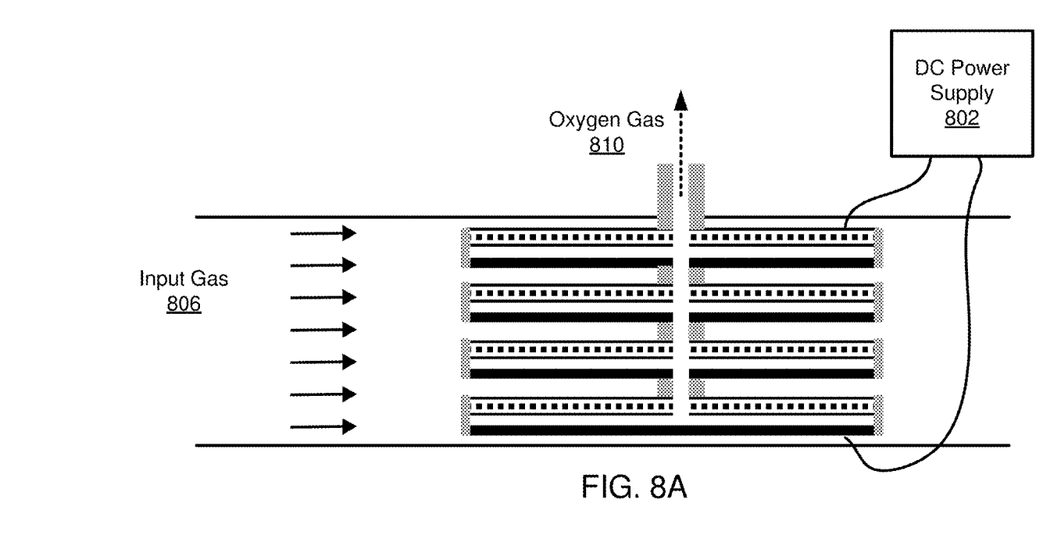
FIG. 8A illustrates an electrochemical stack comprising a plurality of wafers in parallel for receiving input gas flow.
Figure 8B:
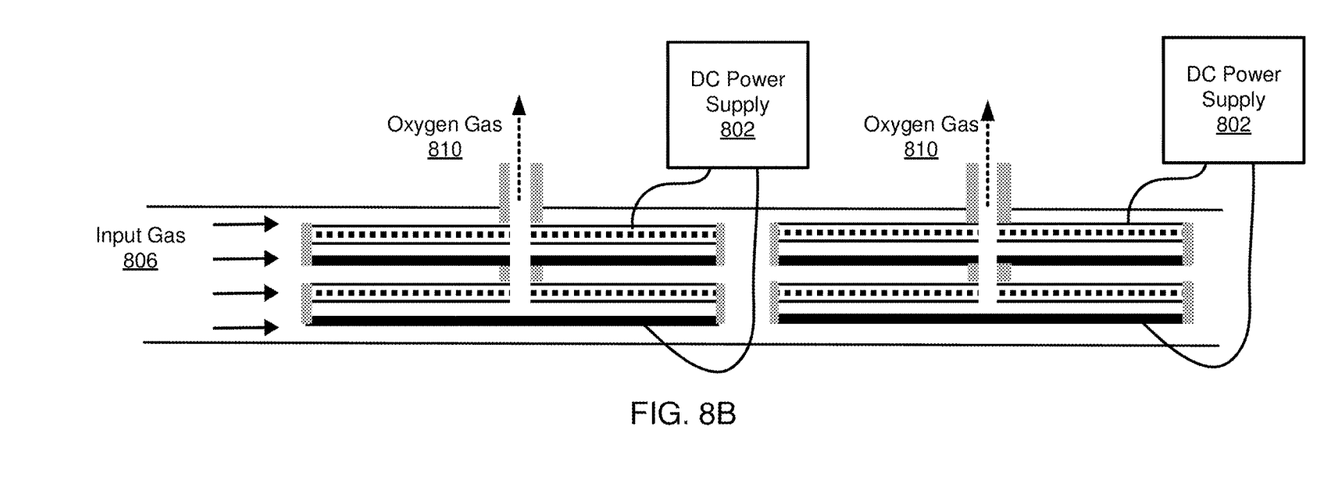
FIG. 8B illustrates a series of two electrochemical stacks each comprising two wafers in parallel for receiving input gas flow.

FIGS. 8A and 8B illustrate embodiments similar to those illustrated in FIGS. 7A and 7B. FIGS. 8A-8B further illustrate that a separate, independent DC power supply 802 may be provided to power each electrochemical stack.

Figure 9:
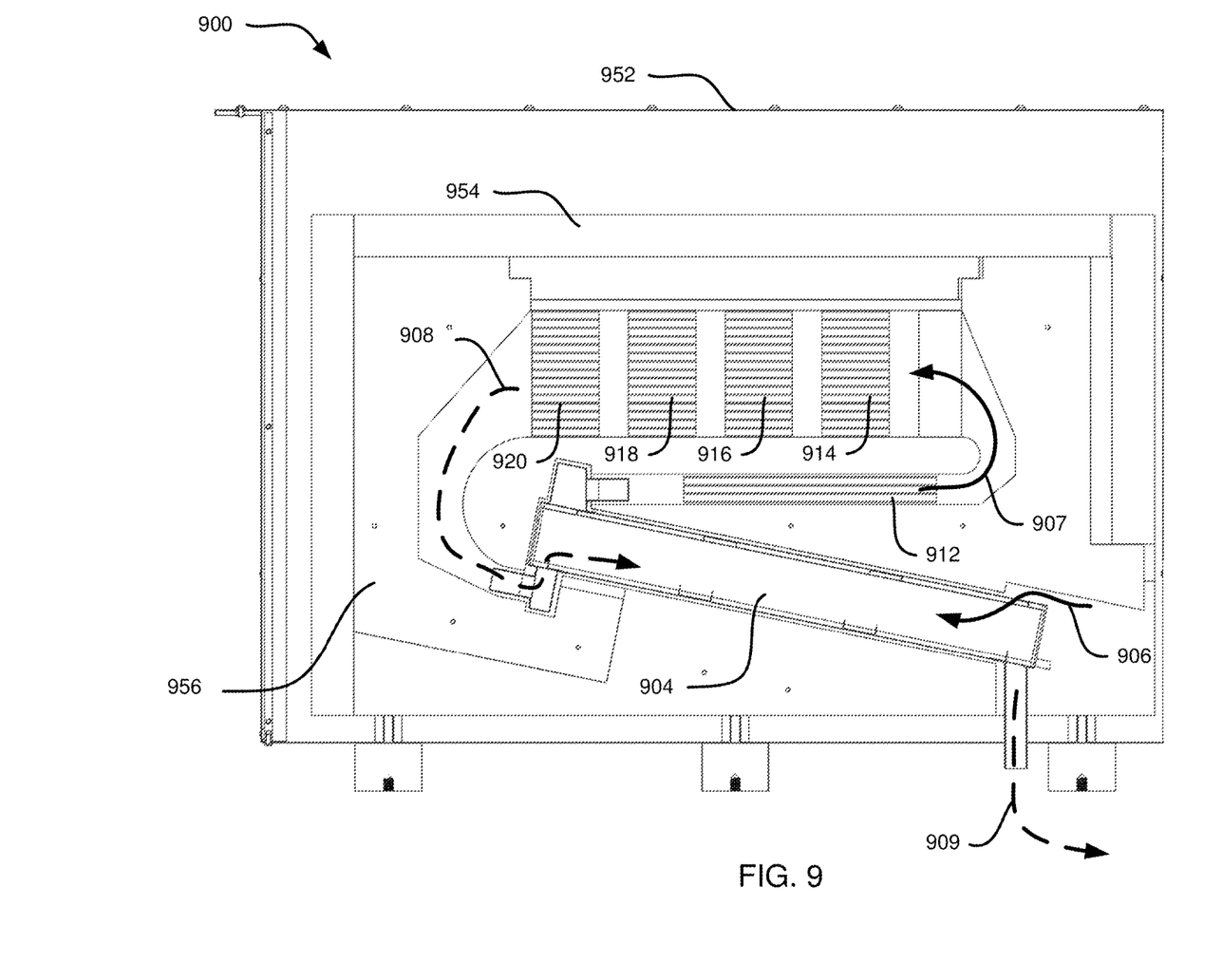
FIG. 9 is a schematic diagram of a system for oxygen concentration with cascade gas flow.

FIG. 9 is a schematic illustration of a system 900 for cascade series gas flow for oxygen concentration using a series of electrochemical stacks. The system 900 illustrated in FIG. 9 includes components illustrated in the system 200 of FIG. 2. The system 900 includes a plurality of electrochemical stacks, including a first electrochemical stack 914, a second electrochemical stack 916, a third electrochemical stack 918, and a fourth electrochemical stack 920. The plurality of electrochemical stacks are arranged in series gas flow such that an output gas from the first electrochemical stack 914 is consumed as an input gas for the second electrochemical stack 916, and so forth. The system 900 includes a heat exchanger 904 and a heater 912. The system includes a channel or tube for carrying oxygen-reduced gas 908 output from the series of electrochemical stacks 914-920 into the heat exchanger 904. The system 900 includes a channel or tube for feeding the high temperature input gas 907 into the first electrochemical stack 914 of the series of electrochemical stacks 914-920. The system 900 includes a channel or tube for outputting the low temperature oxygen-reduced gas 909 from the heat exchanger 904. It should be appreciated that the low temperature oxygen-reduced gas 909 may still have a "high" temperature but will have a reduced temperature relative to the oxygen-reduced gas 908 output by the series of electrochemical stacks 914-920. At least a portion of the heat stored in the high temperature oxygen-reduced gas 908 will be transferred to the ambient input gas 906 by the heat exchanger 904, and this will result in the heat exchanger 904 outputting the low temperature oxygen-reduced gas 909.

The system 900 includes an outer cabinet 952 and an inner cabinet 954. The system 900 includes insulation 956 within the inner cabinet 954. The insulation may include a high-temperature rigid insulation molded around the functional components of the system 900, including the gas channels, the heat exchanger 904, the heater 912, and the series of electrochemical stacks 914-920. The mechanical blower 202 (illustrated in FIG. 2, not pictured in FIG. 9) may drive the input gas 906 into an interior space of the outer cabinet 952. The input gas 906 may further be driven into an interior space of the inner cabinet 954 and then driven into the heat exchanger 904 as illustrated by the solid line (input gas 906) representing input gas flow into the heat exchanger 904.

The gas flow through the system 900 is illustrated by the bold lines, including the solid lines 906, 907 representing the input gas comprising oxygen (the input gas may include air in some implementations) and the dotted lines 908, 909 representing the oxygen-reduced gas byproduct output by the system 900. The input gas includes the input gas 906 which may be fed into the system at ambient conditions, and further includes the heated input gas 907 that has passed through the heat exchanger 904 and the heater 912. The heat exchanger 904 transfers heat from the high temperature oxygen-reduced gas 908 to the input gas 906. This results in the high temperature oxygen-reduced gas 908 cooling down and further results in the input gas 906 heating up. The heated input gas 907 is fed to the series of electrochemical stacks 914-920. The efficiency of the electrochemical stacks 914-920 is optimized at high temperature, and therefore it is advantageous to heat the input gas 906 "for free" by transferring energy from the high temperature oxygen-reduced gas 908 to the input gas 906.

As described herein, the "input gas" for an electrochemical stack may include the oxygen-reduced gas byproduct of an upstream electrochemical stack. The "input gas" includes the gas received by an electrochemical stack as input that results in the electrochemical stack outputting high-purity oxygen gas and an oxygen-reduced gas byproduct. The "input gas" for the entire system 900 may include the input gas 906 driven into the heat exchanger 904, and in some implementations, this includes air at ambient conditions and/or heated air. It should be appreciated that the input gas 906 may include any gas that includes oxygen and does not necessarily include air.

EXAMPLES

The following examples pertain to further embodiments.

Example 1 is a system. The system includes plurality of electrochemical stacks for extracting oxygen from an input gas, wherein the plurality of electrochemical stacks outputs oxygen gas and oxygen-reduced gas. The system includes a heat exchanger in fluid communication with the plurality of electrochemical stacks, wherein the heat exchanger consumes the input gas and the oxygen-reduced gas, and wherein the heat exchanger transfers heat from the oxygen-reduced gas to the input gas. The system includes a mechanical blower for driving the input gas into the heat exchanger. The system is such that the plurality of electrochemical stacks are organized in series gas flow.

Example 2 is a system as in Example 1, wherein the plurality of electrochemical stacks comprises at least a first electrochemical stack, a second electrochemical stack, and a third electrochemical stack organized in the series gas flow such that: the first electrochemical stack consumes the input gas comprising an input gas temperature and outputs a first oxygen-reduced gas comprising a first output gas temperature; the second electrochemical stack consumes the first oxygen-reduced gas and outputs a second oxygen-reduced gas at a second output gas temperature; and the third electrochemical stack consumes the second oxygen-reduced gas and outputs a third oxygen-reduced gas at a third output gas temperature.

Example 3 is a system as in any of Examples 1-2, wherein: the first output gas temperature is greater than the input gas temperature; the second output gas temperature is greater than the first output gas temperature and the input gas temperature; and the third output gas temperature is greater than the second output gas temperature, the first output gas temperature, and the input gas temperature.

Example 4 is a system as in any of Examples 1-3, further comprising a power supply for supplying a current to each of the plurality of electrochemical stacks, wherein the power supply provides a greater current to the third electrochemical stack than the first electrochemical stack.

Example 5 is a system as in any of Examples 1-4, wherein: the first electrochemical stack comprises a first stack temperature during operation of the system; the second electrochemical stack comprises a second stack temperature during operation of the system; the third electrochemical stack comprises a third stack temperature during operation of the system; the third stack temperature is greater than the first stack temperature and the second stack temperature; and the second stack temperature is greater than the first stack temperature.

Example 6 is a system as in any of Examples 1-5, wherein each of the plurality of electrochemical stacks comprises: a plurality of wafers each comprising an ionic ceramic conductive membrane; a leading edge of the plurality of wafers wherein an electrochemical stack receives the input gas; and a trailing edge of the plurality of wafers wherein the electrochemical stack outputs the oxygen-reduced gas; wherein the trailing edge of the plurality of wafers comprises a greater temperature than the leading edge of the plurality of wafers when the system is outputting the oxygen gas.

Example 7 is a system as in any of Examples 1-6, wherein the heat exchanger is a two-fluid heat exchanger configured to transfer the heat from the oxygen-reduced gas to the input gas without mixing the oxygen-reduced gas and the input gas, and wherein: the heat exchanger outputs cooled oxygen-reduced gas from a first output port; and the heat exchanger outputs heated input gas from a second output port, wherein the second output port feeds into the series gas flow for the plurality of electrochemical stacks.

Example 8 is a system as in any of Examples 1-7, further comprising a heater for further heating the heated input gas that is output by the heat exchanger, wherein the heater further heats the heated input gas before the heated input gas enters the series gas flow for the plurality of electrochemical stacks.

Example 9 is a system as in any of Examples 1-8, wherein the input gas is air at ambient temperature, and wherein: the mechanical blower drives the air into a first input port of the heat exchanger; and the series gas flow of the plurality of electrochemical stacks drives the oxygen-reduced gas into a second input port of the heat exchanger.

Example 10 is a system as in any of Examples 1-9, wherein the plurality of electrochemical stacks are organized in the series gas flow such that the input gas is received by a first electrochemical stack and an oxygen-reduced output gas from the first electrochemical stack is received by a second electrochemical stack.

Example 11 is a system as in any of Examples 1-10, wherein the plurality of electrochemical stacks are organized in the series gas flow such that a temperature of the oxygen-reduced gas increases with each of the plurality of electrochemical stacks, and wherein the oxygen-reduced gas received by the heat exchanger is hotter than the input gas received by a first electrochemical stack of the plurality of electrochemical stacks.

Example 12 is a system as in any of Examples 1-11, wherein: the input gas consumed by the heat exchanger is air at ambient temperature; the oxygen-reduced gas output by the plurality of electrochemical stacks is increasingly heated by the plurality of electrochemical stacks in the series gas flow before being consumed by the heat exchanger; and the oxygen gas output by the plurality of electrochemical stacks is high-purity oxygen gas comprising at least 99% oxygen gas ($O_2$).

Example 13 is a system as in any of Examples 1-12, further comprising a plurality of independent power supplies for powering the plurality of electrochemical stacks such that each of the plurality of electrochemical stacks receives a direct current from an independent power supply.

Example 14 is a system as in any of Examples 1-13, wherein: a first power supply is dedicated to a first electrochemical stack in the series gas flow; a second power supply is dedicated to a second electrochemical stack in the series gas flow, wherein the second electrochemical stack consumes the oxygen-reduced gas output by the first electrochemical stack; and the second power supply provides a greater direct current to the second electrochemical stack than the first power supply provides to the first electrochemical stack.

Example 15 is a system as in any of Examples 1-14, wherein a final electrochemical stack in the series gas flow receives a greater current compared with any electrochemical stack located upstream in the series gas flow.

Example 16 is a system as in any of Examples 1-15, wherein, during operation, a final electrochemical stack in the series gas flow comprises a higher running temperature compared with any electrochemical stack located upstream in the series gas flow.

Example 17 is a system as in any of Examples 1-16, wherein, during operation, a final electrochemical stack in the series gas flow outputs oxygen-reduced gas having a higher temperature compared with the oxygen-reduced gas output by any electrochemical stack located upstream in the series gas flow.

Example 18 is a system as in any of Examples 1-17, wherein each of the plurality of electrochemical stacks comprises one or more wafers comprising an ionic ceramic conductive membrane, and wherein: the input gas is passed over the one or more wafers of a first electrochemical stack in the series gas flow; the ionic ceramic conductive membrane of the one or more wafers of the first electrochemical stack interact with the input gas and output high-purity oxygen gas; and remaining gaseous molecules from the input gas are passed over a second electrochemical stack in the series gas flow after the high-purity oxygen gas has been extracted by the ionic ceramic conductive membrane of the one or more wafers of the first electrochemical stack.

Example 19 is a system as in any of Examples 1-18, further comprising a collection tank for receiving the oxygen gas output by the plurality of electrochemical stacks, wherein the collection tank is in fluid communication with each of the plurality of electrochemical stacks.

Example 20 is a system as in any of Examples 1-19, further comprising a collection tube in fluid communication with each of the plurality of electrochemical stacks for receiving the oxygen gas output by the plurality of electrochemical stacks, and wherein the collection tube is airtight such that gaseous contaminants are not introduced into the oxygen gas output by the plurality of electrochemical stacks.

Although the subject matter has been described in language specific to structural features and/or methodological acts, it is to be understood that the subject matter is not necessarily limited to the described features or acts described above. Rather, the described features and acts are disclosed as example forms of implementing the present disclosure described herein.

While various exemplary embodiments of the present disclosure have been described above, it should be understood that they have been presented by way of example only, and not limitation. Various changes in form and detail can be made therein without departing from the spirit and scope of the disclosure. Thus, the breadth and scope of the present disclosure should not be limited by any of the above-described exemplary embodiments. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations might be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by any future claims submitted here and in different applications, and their equivalents.

What is claimed is:

1. A system comprising:
    a plurality of electrochemical stacks for extracting oxygen from an input gas, wherein the plurality of electrochemical stacks output oxygen gas and oxygen-reduced gas;
    a heat exchanger in fluid communication with the plurality of electrochemical stacks, wherein the heat exchanger consumes the input gas and the oxygen-reduced gas, and wherein the heat exchanger transfers heat from the oxygen-reduced gas to the input gas; and
    a mechanical blower for driving the input gas into the heat exchanger;
    wherein the plurality of electrochemical stacks are organized in series gas flow.

2. The system of claim 1, wherein the plurality of electrochemical stacks comprises at least a first electrochemical stack, a second electrochemical stack, and a third electrochemical stack organized in the series gas flow such that:
    the first electrochemical stack consumes the input gas comprising an input gas temperature and outputs a first oxygen-reduced gas comprising a first output gas temperature;
    the second electrochemical stack consumes the first oxygen-reduced gas and outputs a second oxygen-reduced gas at a second output gas temperature; and
    the third electrochemical stack consumes the second oxygen-reduced gas and outputs a third oxygen-reduced gas at a third output gas temperature.

3. The system of claim 2, wherein:
    the first output gas temperature is greater than the input gas temperature;
    the second output gas temperature is greater than the first output gas temperature and the input gas temperature; and
    the third output gas temperature is greater than the second output gas temperature, the first output gas temperature, and the input gas temperature.

4. The system of claim 2, further comprising a power supply for supplying a current to each of the plurality of electrochemical stacks, wherein the power supply provides a greater current to the third electrochemical stack than the first electrochemical stack.

5. The system of claim 2, wherein:
    the first electrochemical stack comprises a first stack temperature during operation of the system;
    the second electrochemical stack comprises a second stack temperature during operation of the system;
    the third electrochemical stack comprises a third stack temperature during operation of the system;
    the third stack temperature is greater than the first stack temperature and the second stack temperature; and
    the second stack temperature is greater than the first stack temperature.

6. The system of claim 1, wherein each of the plurality of electrochemical stacks comprises:
    a plurality of wafers each comprising an ionic ceramic conductive membrane;
    a leading edge of the plurality of wafers wherein an electrochemical stack receives the input gas; and
    a trailing edge of the plurality of wafers wherein the electrochemical stack outputs the oxygen-reduced gas;
    wherein the trailing edge of the plurality of wafers comprises a greater temperature than the leading edge of the plurality of wafers when the system is outputting the oxygen gas.

7. The system of claim 1, wherein the heat exchanger is a two-fluid heat exchanger configured to transfer the heat from the oxygen-reduced gas to the input gas without mixing the oxygen-reduced gas and the input gas, and wherein:
    the heat exchanger outputs cooled oxygen-reduced gas from a first output port; and
    the heat exchanger outputs heated input gas from a second output port, wherein the second output port feeds into the series gas flow for the plurality of electrochemical stacks.

8. The system of claim 7, further comprising a heater for further heating the heated input gas that is output by the heat exchanger, wherein the heater further heats the heated input gas before the heated input gas enters the series gas flow for the plurality of electrochemical stacks.

9. The system of claim 1, wherein the input gas is air at ambient temperature, and wherein:
    the mechanical blower drives the air into a first input port of the heat exchanger; and the series gas flow of the plurality of electrochemical stacks drives the oxygen-reduced gas into a second input port of the heat exchanger.

10. The system of claim 1, wherein the plurality of electrochemical stacks are organized in the series gas flow such that the input gas is received by a first electrochemical stack and an oxygen-reduced output gas from the first electrochemical stack is received by a second electrochemical stack.

11. The system of claim 1, wherein the plurality of electrochemical stacks are organized in the series gas flow such that a temperature of the oxygen-reduced gas increases with each of the plurality of electrochemical stacks, and wherein the oxygen-reduced gas received by the heat exchanger is hotter than the input gas received by a first electrochemical stack of the plurality of electrochemical stacks.

12. The system of claim 1, wherein:
the input gas consumed by the heat exchanger is air at ambient temperature;
the oxygen-reduced gas output by the plurality of electrochemical stacks is increasingly heated by the plurality of electrochemical stacks in the series gas flow before being consumed by the heat exchanger; and
the oxygen gas output by the plurality of electrochemical stacks is high-purity oxygen gas comprising at least 99% oxygen gas ($O_2$).

13. The system of claim 1, further comprising a plurality of independent power supplies for powering the plurality of electrochemical stacks such that each of the plurality of electrochemical stacks receives a direct current from an independent power supply.

14. The system of claim 13, wherein:
a first power supply is dedicated to a first electrochemical stack in the series gas flow;
a second power supply is dedicated to a second electrochemical stack in the series gas flow, wherein the second electrochemical stack consumes the oxygen-reduced gas output by the first electrochemical stack; and
the second power supply provides a greater direct current to the second electrochemical stack than the first power supply provides to the first electrochemical stack.

15. The system of claim 14, wherein a final electrochemical stack in the series gas flow receives a greater current compared with any electrochemical stack located upstream in the series gas flow.

16. The system of claim 1, wherein, during operation, a final electrochemical stack in the series gas flow comprises a higher running temperature compared with any electrochemical stack located upstream in the series gas flow.

17. The system of claim 1, wherein, during operation, a final electrochemical stack in the series gas flow outputs oxygen-reduced gas having a higher temperature compared with the oxygen-reduced gas output by any electrochemical stack located upstream in the series gas flow.

18. The system of claim 1, wherein each of the plurality of electrochemical stacks comprises one or more wafers comprising an ionic ceramic conductive membrane, and wherein:
the input gas is passed over the one or more wafers of a first electrochemical stack in the series gas flow;
the ionic ceramic conductive membrane of the one or more wafers of the first electrochemical stack interact with the input gas and output high-purity oxygen gas; and
remaining gaseous molecules from the input gas are passed over a second electrochemical stack in the series gas flow after the high-purity oxygen gas has been extracted by the ionic ceramic conductive membrane of the one or more wafers of the first electrochemical stack.

19. The system of claim 1, further comprising a collection tank for receiving the oxygen gas output by the plurality of electrochemical stacks, wherein the collection tank is in fluid communication with each of the plurality of electrochemical stacks.

20. The system of claim 1, further comprising a collection tube in fluid communication with each of the plurality of electrochemical stacks for receiving the oxygen gas output by the plurality of electrochemical stacks, and wherein the collection tube is airtight such that gaseous contaminants are not introduced into the oxygen gas output by the plurality of electrochemical stacks.

* * * * *